US012641023B2

(12) United States Patent
Biradar et al.

(10) Patent No.: US 12,641,023 B2
(45) Date of Patent: May 26, 2026

(54) TOKENIZER AND WILDCARD LOOKUP

(71) Applicant: Advanced Micro Devices, Inc., Santa Clara, CA (US)

(72) Inventors: Rajshekhar Biradar, Bangalore (IN); Sunil Kulkarni, Bangalore (IN); Manjunath Shivanna, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 427 days.

(21) Appl. No.: 18/373,908

(22) Filed: Sep. 27, 2023

(65) Prior Publication Data

US 2025/0106155 A1     Mar. 27, 2025

(51) Int. Cl.
H04L 45/745     (2022.01)
H04L 9/40     (2022.01)
H04L 45/00     (2022.01)

(52) U.S. Cl.
CPC ............ H04L 45/745 (2013.01); H04L 45/54 (2013.01); H04L 63/0428 (2013.01)

(58) Field of Classification Search
CPC ... H04L 45/745; H04L 45/54; H04L 63/0428; G06F 16/9566; G06F 16/137; G06F 16/285; G06Q 20/04
See application file for complete search history.

(56) References Cited

U.S. PATENT DOCUMENTS

| | | | | |
|---|---|---|---|---|
| 7,814,204 B1* | 10/2010 | Wang | ................... | G06F 16/9566 |
| | | | | 709/227 |
| 2004/0073621 A1* | 4/2004 | Sampson | ............... | G06Q 20/04 |
| | | | | 707/999.009 |
| 2021/0049191 A1* | 2/2021 | Masson | ................. | G06F 16/285 |
| 2024/0232158 A1* | 7/2024 | Reichinger | ........... | G06F 16/137 |

* cited by examiner

*Primary Examiner* — Vinncelas Louis
(74) *Attorney, Agent, or Firm* — Patterson + Sheridan, LLP

(57)     ABSTRACT

Embodiments herein describe tokenizing a data sequence to perform a wildcard lookup. For example, a network device (such as a NIC or a switch) can receive a data sequence (e.g., an IP address, Uniform Resource Locator (URL), domain name, etc.) which can be broken down into separate tokens. After identifying a first token, the network device can search a wildcard lookup table to determine a first entry in the table that matches the first token. Assuming there is a match, the network device can identify an action associated with the entry. If the action is to continue with the search, the network device can then retrieve a key from the entry which it then combines with a second token in the data sequence to again search the wildcard lookup table.

20 Claims, 5 Drawing Sheets

Wildcard Lookup  305

Token1.Token2.Token3.*

Wildcard Lookup  310

Token1.Token2.Token4.*

Wildcard
Lookup table

115

| Entry ID | Match Terms | Key | Action |
|---|---|---|---|
| 1 | [0,Token1] | 1 | Continue |
| 2 | [1,Token2] | 2 | Continue |
| 3 | [2,Token3] | - | Action1 |
| 4 | [2,Token4] | - | Action2 |

Wildcard Lookup 405

*.xyz.com

Wildcard Lookup 410

*.abc.def.io

DNS
Lookup table
400

| Entry ID | Match Terms | Key | Action |
|----------|-------------|------|----------|
| 0xF1 | 0,com | 0xF1 | continue |
| 0xF2 | 0xF1,xyz | - | deny |
| 0xF3 | 0,io | 0XF3 | continue |
| 0xF4 | 0xF3,def | 0xF4 | continue |
| 0xF5 | 0xF4,abc | - | deny |

IP Address Lookup table

500

Wildcard Lookup  505

192.123.*

Wildcard Lookup  510

192.234.*

Wildcard Lookup  515

10.1.1.*

| Entry ID | Match Terms | Key | Action |
|----------|-------------|-----|--------|
| 0xf1 | 0,192 | 0xf1 | continue |
| 0xf7 | 0,10 | 0xf7 | continue |
| 0xf2 | 0xf1,123 | - | allow |
| 0xf3 | 0xf1,234 | - | deny |
| 0xf4 | 0xf7,1 | 0xf4 | continue |
| 0xf5 | 0xf4,1 | - | deny |

TOKENIZER AND WILDCARD LOOKUP

TECHNICAL FIELD

Examples of the present disclosure generally relate to tokenizing data sequences for wildcard lookup.

BACKGROUND

In a data communication network, network or routing devices receive messages at one of a set of input interfaces and forward them on to one or more of a set of output interfaces. Users typically require that such routing devices operate as quickly as possible in order to keep pace with a high rate of incoming messages.

Some network operations are also performed in a network interface controller (NIC) (e.g., a smartNIC). For example, a NIC (or a switch) may block malicious domain names, perform IP prefix/suffix match, perform 5G User Plan Function (UPF) offloads, etc. These operations can involve performing lookup operations which are often performed in software. However, these software-based solutions can be compute intensive.

SUMMARY

One embodiment described herein is a network device that includes a wildcard lookup table and a tokenizer that includes circuitry configured to tokenize a data sequence. Moreover, the network device includes circuitry configured to identify a first token in the data sequence, search the wildcard lookup table for a match based on the first token, upon identifying a first entry that matches, determine to continue searching the wildcard lookup table based on an action stored in the first entry, identify a key in the first entry, combine the key with a second token in the data sequence to create a new search query, and search the wildcard lookup table based on the new search query.

One embodiment described herein is a method that includes receiving a data sequence, identifying a first token in the data sequence, searching a wildcard lookup table for a match based on the first token, upon identifying a first entry that matches, determining to continue searching the wildcard lookup table based on an action stored in the first entry, identifying a key in the first entry, combining the key with a second token in the data sequence to create a new search query, and searching the wildcard lookup table based on the new search query.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
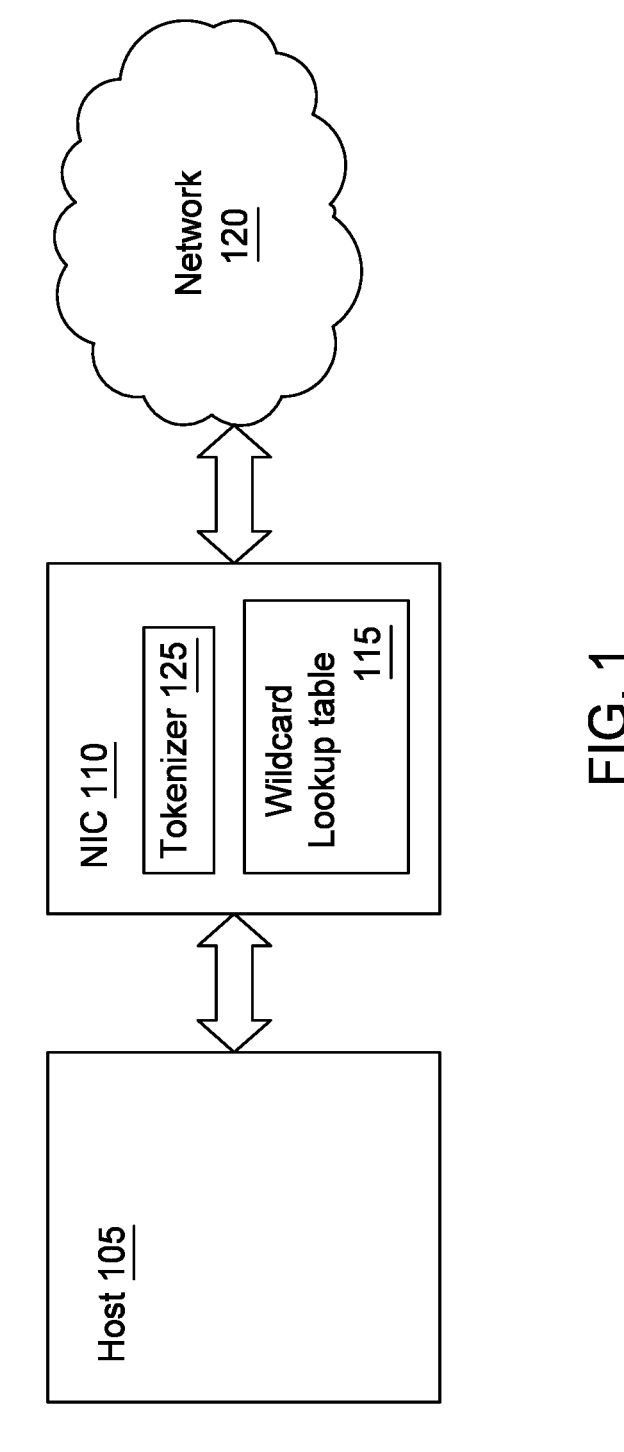
FIG. 1 is a block diagram of a networking system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown, An aspect or an advantage described in conjunction with a particular example is not necessarily limited to that example and can be practiced in any other examples even if not so illustrated, or if not so explicitly described.

Embodiments herein describe tokenizing a data sequence to perform a wildcard lookup. For example, a network device (such as a NIC or a switch) can receive a data sequence (e.g., an IP address, Uniform Resource Locator (URL), domain name, etc.) which can be broken down into separate tokens (i.e., tokenized). In one embodiment, the hardware in the networking device can support a variable number of tokens of variable length (e.g., the tokens in the data sequence can have different numbers of characters).

After identifying a first token, circuitry in the network device can perform a search operation in a wildcard lookup table (e.g., a hash table lookup which includes hash collision resolution) to determine whether any entry in the table matches the first token. Although not required, in one embodiment, the network device adds a default key to the first token (e.g., 0) before performing the search. Assuming there is a match, the network device can identify an action associated with the entry. For example, the action may be one of: continue the search, block a packet, report to CPU, permit the packet to pass through the network device, etc. If the action is "continue the search", this means the wildcard lookup is not complete and the network device should continue to search the table. In one embodiment, any entry in the wildcard lookup table with the "continue" action also includes a "next" key field. The network device can retrieve this next key and combine it with a second token in the data sequence to again search the table.

If there is a match, the network device can again evaluate the action to determine whether it should perform another search (using the next key stored in that entry and a third token) or whether it has reached a final action—e.g., block a packet, report to CPU, permit the packet to pass through the network device, etc. When the network device reaches the final action, this is the end of the wildcard lookup. For example, a wildcard domain name can be *.abc.def.io where any domain name that has the same suffix as "abc.def.io" should match the wildcard lookup. In this case, the symbol "*" is a wildcard symbol or a "do not care". This could include xyz.abc.def.io or egh.abc.def.io. When identifying a malicious domain name, the tokenizer would tokenize from right to left (starting with "io") and circuitry in the network device performs a search in the wildcard lookup table to see if the current domain name has the same suffix as abc.def.io. If so, the NIC can perform an action such as blocking the domain name.

A wildcard lookup for an IP address can be 192.123.* where any IP address that has the same prefix as "192.123" should match the wildcard lookup. This could include addresses 192.123.145.132 or 192.123.178.132. To identify an of-interest IP address, the tokenizer tokenizes the IP address from left to right (starting with "192") and performs a search in the wildcard lookup table to see if the current IP address has the same prefix of 192.123. If so, the NIC can perform an action such as prioritizing the network traffic, forwarding the traffic for further processing in the NIC, or blocking the traffic.

Advantageously, the embodiments herein can be performed more efficiently than current software-based solutions that perform wildcard lookups. The special structure of the wildcard lookup table can enable a purely hardware based solution that can execute faster than a software-based solution.

FIG. 1 is a block diagram of a networking system 100, according to an example. The system 100 includes a host 105, a NIC 110, and a network 120. The host 105 can be any type of computing device—e.g., a server, desktop, laptop, etc. The host 105 can include one or more processors (e.g., central processing units (CPUs)) which each can include one or more processing cores.

The NIC 110 can be a SmartNIC. The NIC 110 can be a peripheral device (e.g., an 10 device) that is coupled to the processors in the host 105. For example, the NIC 110 and the host 105 may be coupled by a PCIe connection. The NIC 110 may be mounted on a peripheral card or on a printed circuit board (PCB). In one embodiment, the NIC 110 is included in the same box or enclosure as the host 105, although this is not a requirement.

The NIC 110 includes a tokenizer 125 and a wildcard lookup table 115. The tokenizer 125 (e.g., circuitry) divides data sequences into tokens, which is a process that is referred to herein as tokening. The data sequence can be a string of characters which can include numbers, letters, symbols, or combinations thereof. The data sequences can include special symbols that the tokenizer 125 uses to divide the sequences into separate tokens. For example, with domain names (e.g., abc.generic.com) or IP addresses (192.168.123.123) the special symbols can be the periods (" ") which divide the data sequences into tokens (e.g., abc, generic, com and 192, 168, 123, 123).

The wildcard lookup tables 115 are special tables for performing wildcard lookups using the tokens identified by the tokenizer 125. The details of the wildcard lookup are described in FIGS. 2-5 below. In one embodiment, the wildcard lookup table 115 is part of match action hardware in the NIC 110 that extracts keys from the packet and matches these keys through various tables to identify one or more actions to perform. In one embodiment, the wildcard lookup tables 115 are part of a packet processing pipeline in the NIC 110. In one embodiment, the wildcard lookup tables 115 are part of a P4 architecture for processing packets received from the network 120. Because the tokens in domain names can be variable length, in one embodiment, the pipeline architecture supports a tokenizer that can identify variable length tokens. In one embodiment, the wildcard lookup tables 115 are implemented using DRAM or SRAM. The network 120 can be a local area network (LAN) or a wide area network (WAN) (e.g., the Internet). The NIC 110 serves as an interface between the host 105 and the network 120 (or between two networks) so that packets can be exchanged between the host 105 and the network 120. Further, instead of simply forwarding received packets, the NIC 110 can perform operations on the packets such as blocking malicious domain names, performing IP prefix/suffix match, performing 5G UPF offloads, etc. using the tokenizer 125 and the wildcard lookup table 115. Further, while the embodiments herein describe performing wildcard lookup in the NIC 110, these lookups could also be performed in a switch in the network 120 or in the host 105. That is, the embodiments herein are not limited to being performed within the NIC 110.

Figure 2:
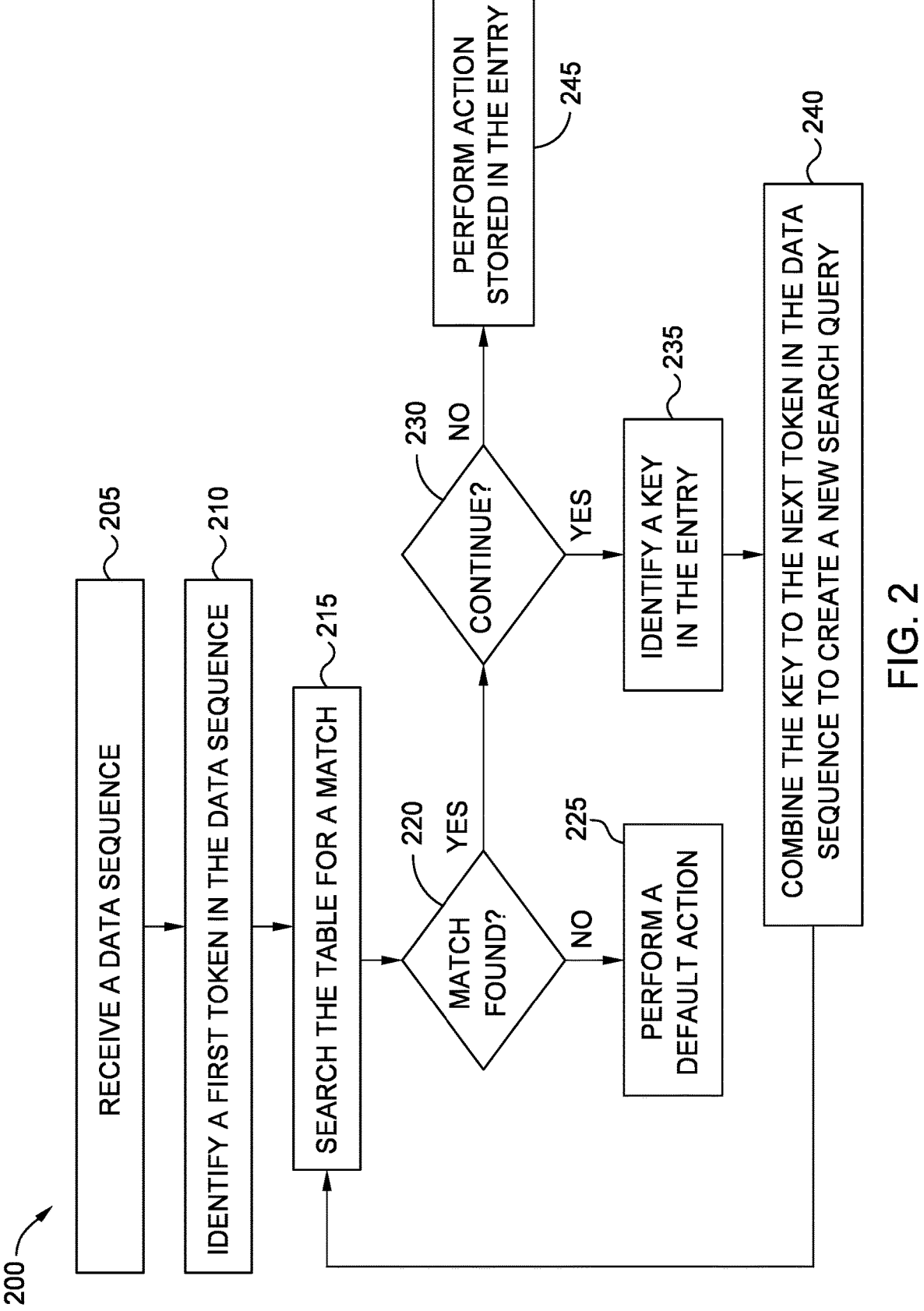
FIG. 2 is a flowchart for tokenizing a data sequence to perform a wildcard lookup, according to an example.

FIG. 2 is a flowchart of a method 200 for tokenizing a data sequence to perform a wildcard lookup, according to an example. At block 205, the NIC receives a data sequence. The data sequence can be a string of numbers, characters or both. Moreover, the data sequence can include symbols. In any case, the data sequence includes special symbols that permit the tokenizer to divide the data sequence into tokens.

Figure 3:
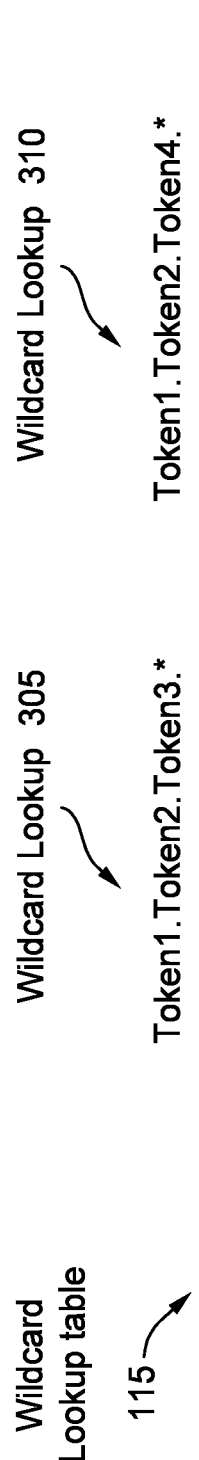
FIG. 3 is a table for performing a wildcard lookup, according to an example.

For ease of explanation, the remaining blocks in method 200 are discussed in tandem with FIG. 3 which illustrates a table of tokens for performing a wildcard lookup, according to an example. FIG. 3 provides two example wildcard lookups 305 and 310. Wildcard lookup 305 matches any data sequence that has a prefix that matches Token1.Token2.Token3 while wildcard lookup 310 matches any data sequence with a prefix of Token1.Token2.Token4. These wildcard lookups are used to configure the data stored in the wildcard lookup table 115, which has four entries (Entry IDs 1-4). Accessing the table 115 is discussed in more detail in the blocks of the method 200.

Returning to method 200, at block 210 the tokenizer identifies a first token in the data sequence received at block 205. As a first example, assume the received data sequence is Token1.Token2.Token3.Token5. As such, this token should satisfy the wildcard lookup 305 since it has the same prefix: Token1.Token2.Token3.

At block 215, circuitry in the network device searches the wildcard lookup table for a match to the first token. That is, the network device searches the entries in the table 115 to see if the first token matches the data stored in the "Match Terms" column of the table 115. In this example, the network device also adds a default key ("0") to the first token when querying the table. In this example, the network device searches for [0,Token1].

At block 220, the network device determines if there is a match found. In this example, there is a match to Entry 1 in the table 115 since it stores [0,Token1] in its Match Terms column.

The method 200 then proceeds to block 230 where NIC determines whether the action in the matched entry indicates whether the wildcard lookup should continue. As shown in FIG. 3, the action for Entry 1 is "continue" indicating that the wildcard lookup should continue.

In response, the method 200 proceeds to block 235 where the NIC identifies a key in the entry. That is, the NIC retrieves the value stored in the "Key" column of the matched entry—"1" in this case. In this embodiment, the value stored in the Key column for each entry is the same as the entry ID, which makes them unique relative to the other keys stored in the table 115. This is convenient since the entry ID is unique, and thus, serves as a suitable value for the key of the entry. However, this is not a requirement. The values for the key could be any suitable value that permits the NIC to use the key to perform the next lookup into the wildcard lookup table as described below.

At block 240, the NIC combines the key to the next token in the data sequence to create a new search query for the table 115. Continuing the example above, the NIC combines the key retrieved from Entry 1—i.e., 1—with the second token of the data sequence received at block 205—i.e., Token2—to create a new search query—i.e., [1,Token2].

The method 200 returns to block 215 where the NIC again searches the table 115 for a match to the new search query.

At block 220, the NIC determines that the new search query matches the match term in Entry 2 in the table 115 (i.e., [1,Token2]).

At block 230, the NIC determines that the action for Entry 2 is again "continue" which means the method 200 proceeds to blocks 235 and 240 where it generates a new search query using the third token and the key stored in Entry 2—i.e., [2,Token3].

The method 200 returns to block 215 to again search the table 115 using the new search query and determines at block 220 that it matches Entry 3 of the table 115.

However, at block 230, the NIC determines that the action for Entry 3 is not continue, but is rather "Action1". Thus, the method 200 proceeds to block 245 where it performs the action stored in the entry. Put differently, by reaching an entry which stores an action other than "continue" this indicates the NIC has completed the wildcard lookup and identified a data sequence that satisfies the wildcard lookup 305. The NIC then performs the action, which can be any desired action, such as blocking a packet, alerting the host, permitting the traffic, forwarding a corresponding packet to another hardware stage in the NIC for further processing, and the like.

If at any time a match is not found at block 220, this means the data sequence does not satisfy the wildcard lookup. That is, none of the entries in the table 115 match the current search query. Thus, the method 200 instead proceeds to block 225 where it performs a default action. This could include permitting an associated packet to proceed, blocking the packet, alerting the host, etc. For example, if the goal of the wildcard lookup is to identify a domain name that matches a malicious domain name, the action performed at block 245 when a received domain name satisfies the wildcard lookup can be blocking the associated packet(s). In contrast, the action performed at block 225 when a domain name does not satisfy the wildcard lookup can be permitting the associated packet(s) to proceed.

Repeating the method 200, assume that the data sequence received at block 205 is Token1.Token2.Token4.Token6. In this scenario, the method 200 proceeds as explained above where the network device identifies the first token in the sequence (i.e., Token1) which matches to Entry 1. Because this entry stores a "continue" action, the NIC then uses its key and the second token (Token2) to create the new search query [1,Token2], which matches to Entry 2. Because this entry also stores a "continue" action, the NIC uses its key and the third token (Token4) to create the new search query [2,Token4]. This search query then matches to Entry 4 which stores the Action2. This indicates the received data sequence satisfies the wildcard lookup 310, and as such, the NIC should perform the action stored in Entry 4. Notably, this action could be the same as Action1 that corresponds to the wildcard lookup 305, or may be a different action.

Notably, Entries 3 and 4 in the table 115 do not need to have key values since these entries terminate the wildcard lookup. Stated differently, since the key values are combined with the next token to create a new search query, the Entries 3 and 4 do not need keys since the table 115 is not searched again once the NIC reaches either of these entries. In this manner, any received data sequence that has a prefix that matches either Token1.Token2.Token3 or Token1.Token2.Token4 will satisfy the wildcard lookup 305 or 310 and cause the NIC to perform Action1 or Action2. However, any received data sequences that do not have either of these prefixes will instead cause the NIC to perform the default action. In this manner, by using the keys and the method 200, a wildcard lookup table 115 can be configured to identify any number of different wildcard lookups.

Also, as discussed using the embodiments below, the method 200 can tokenize a received data sequence either from right to left to identify matching suffixes (as discussed in FIG. 4) or from left to right to identify matching prefixes (as discussed in FIG. 5).

Figure 4:
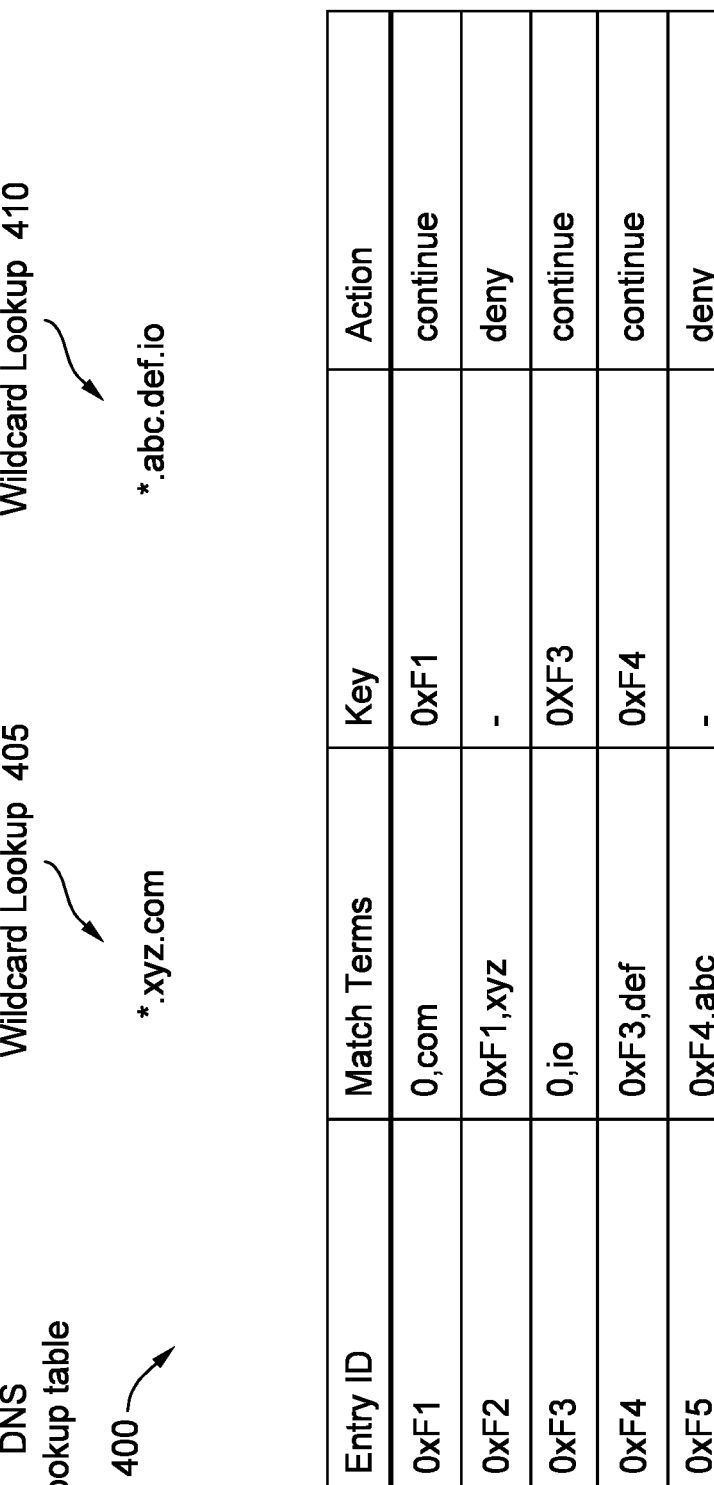
FIG. 4 is a table for performing a wildcard lookup as part of a domain name system (DNS) query, according to an example.

FIG. 4 is a table 400 of tokens for performing a wildcard lookup, according to an example. In this example, the table 400 can be used to perform wildcard lookups for domain name system (DNS) lookups. For instance, the NIC may perform a specific action (e.g., deny the request) when a received DNS lookup matches either the wildcard lookup 405 or the wildcard lookup 410. Put differently, the DNS lookup table 400 is a type of wildcard lookup table that can be used along with method 200 to determine whether network traffic associated with a particular domain name should be denied or permitted.

The table 400 includes entries 0xF1-0xF5 that are configured to identify any domain name that has the same suffix as either wildcard lookup 405 (*xyz.com) or wildcard lookup 410 (*.abc.def.io). Because the goal of the wildcard lookups 405 and 410 is to identify matching suffixes, the tokenizer tokenizes the received data sequences from right to left.

As a first example, assume the NIC receives the domain name abc.xyz.com. According to method 200, the tokenizer identifies the first token (com) which the network device combines with a default key (0) and searches the table 400 for a match of [0,com]. This matches with Entry 0xF1 which has an action of "continue". In response, the NIC combines that entry's key (0xF1) with the second token (xyz) to create a new search query [0xF1,xyz] and again searches the table 400.

This search query matches Entry 0xF2, which has the action of "deny" Since its action is different from "continue", the NIC knows it has identified a domain name that satisfies the wildcard lookup 405. The NIC then denies the network traffic associated with this domain name.

As a second example, assume the NIC receives the domain name example.abc.def.io. According to method 200, the tokenizer identifies the first token (io) which the network device then combines with a default key (0) and searches the table 400 for a match of [0,io]. This matches with Entry 0xF3 (the third entry) which has an action of "continue". In response, the NIC combines that entry's key (0xF3) with the second token (def) to create a new search query [0xF3,def] and again searches the table 400.

This matches with Entry 0xF4 (the fourth entry) which also has an action of "continue". In response, the NIC combines that entry's key (0xF4) with the third token (abc) to create a new search query [0xF4,abc] and again searches the table 400.

This search query matches Entry 0xF5 (the fifth entry), which has an action of "deny". Since its action is different from "continue", the NIC knows it has identified a domain name that satisfies the wildcard lookup 410. The NIC then denies the network traffic associated with this domain name.

However, if the NIC receives a domain name that does not satisfy one of the wildcard lookups 405 or 410, it can perform a default action such as permitting the domain name to communicate with the host. For example, if the received data sequence is zyx.com or def.io, these examples would not satisfy either of the wildcard lookups 405 or 410 and the NIC performs the default action.

Figure 5:
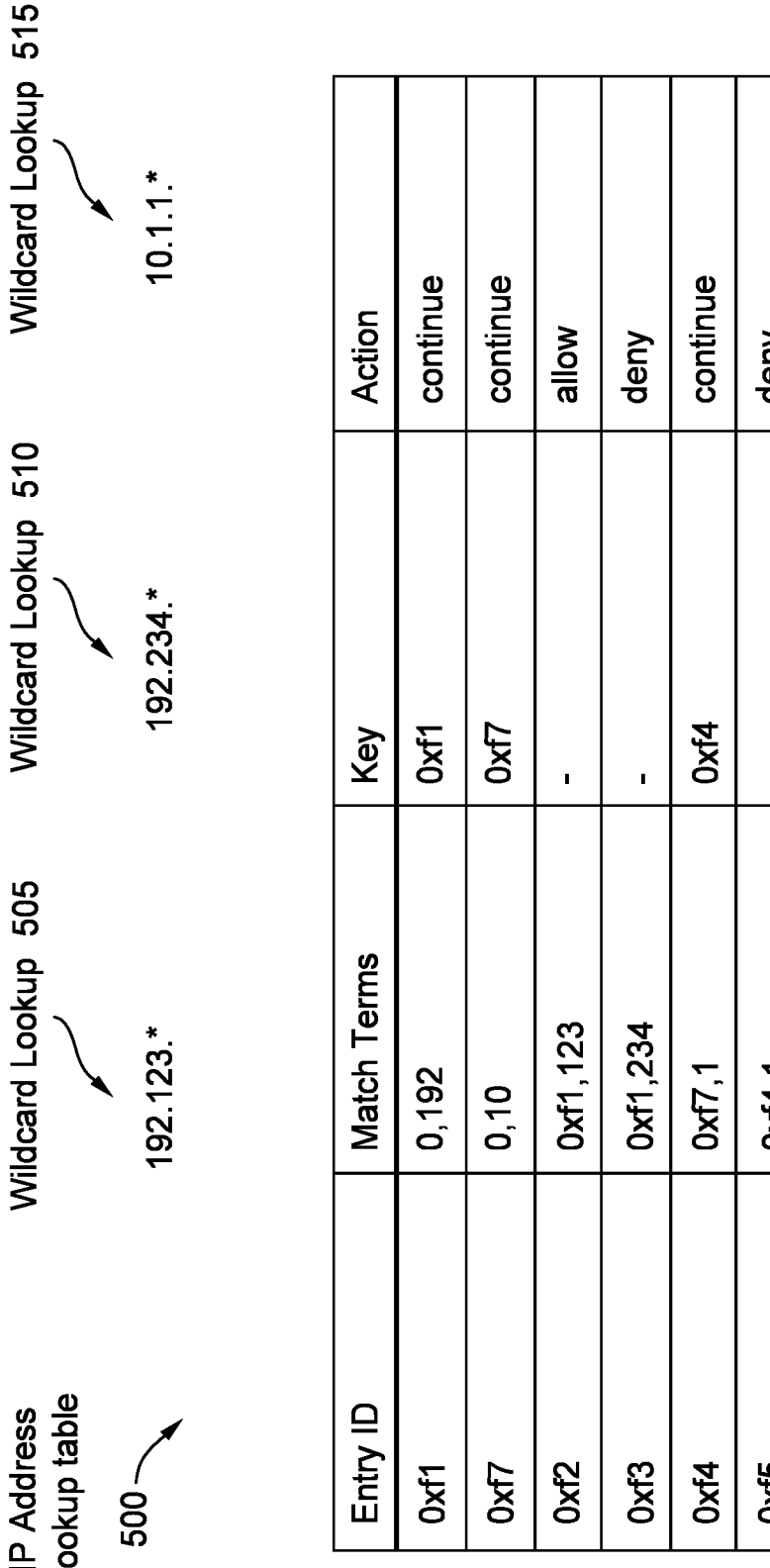
FIG. 5 is a table for performing a wildcard lookup as part of an IP address match, according to an example.

FIG. 5 is a table 500 of tokens for performing a wildcard lookup, according to an example. In this example, the table 500 can be used to perform wildcard lookups for IP lookups. For instance, the NIC may perform a specific action (e.g., allow or deny) when a received IP address matches any one of the wildcard lookups 505, 510, or 515. Put differently, the IP lookup table 500 is a type of wildcard lookup table that can be used along with method 200 to determine whether data associated with an IP address should be denied or allowed.

The table 500 includes six entries that are configured to identify any IP address that has the same prefix as wildcard lookup 505 (192.123,*), wildcard lookup 510 (192.234,*), or wildcard lookup 515 (10.1.1.*). Because the goal of the wildcard lookups 505, 510, and 515 is to identify matching prefixes, the tokenizer tokenizes the received data sequences from left to right.

As a first example, assume the NIC receives the IP address 192.123.698. According to method 200, the tokenizer identifies the first token (192) which the network device then combines with a default key (0) and searches the table 500 for a match of [0,192]. This matches with Entry 0xf1 which has an action of "continue". In response, the NIC combines that entry's key (0xf1) with the second token (123) to create a new search query [0xf1.123] and again searches the table 500.

This search query matches Entry 0xf2 which has an action of "allow". Since its action is different from "continue", the NIC knows it has identified an IP address that satisfies the wildcard lookup 505. The NIC then allows the data associated with the received IP address to flow through it.

As a second example, assume the NIC receives the IP address 192.234.567. According to method 200, the tokenizer identifies the first token (192) which the network device then combines with a default key (0) and searches the table 400 for a match of [0,192]. This again matches with Entry 0xf1 which has an action of "continue". In response, the NIC combines that entry's key (0xf1) with the second token (234) to create a new search query [0xf1,234] and again searches the table 500.

This matches with Entry 0xf3 which also has an action of "deny". Since its action is different from "continue", the NIC knows it has identified an IP address that satisfies the wildcard lookup 510. The NIC then blocks the data associated with the received IP address.

As a third example, assume the NIC receives the IP address 10.1.1.0. According to method 200, the tokenizer identifies the first token (10) which the network device then combines with a default key (0) and searches the table 500 for a match of [0,10], This matches with Entry 0xf7 which has an action of "continue". In response, the NIC combines that entry's key (0xf7) with the second token (1) to create a new search query [0xf7,1] and again searches the table 500.

This matches with Entry 0xf4 which also has an action of "continue". In response, the NIC combines that entry's key (0xf4) with the third token (1) to create a new search query [0xf4,1] and again searches the table 500.

This matches with Entry 0xf5, which has an action of "deny". Since its action is different from "continue", the NIC knows it has identified an IP address that satisfies the wildcard lookup 515. The NIC then blocks the data associated with the received IP address.

However if the received IP address does not satisfy one of the wildcard lookups 505, 510, or 515, the NIC can perform a default action such forwarding the IP packet to another stage in a pipeline for additional processing. For example, if the received IP address is 192.321.0.1 or 10.1.0.1, these examples would not satisfy any of the wildcard lookups 505, 510, or 515 and the NIC performs the default action.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network device, comprising:
a wildcard lookup table;
a tokenizer comprising circuitry configured to tokenize a data sequence,
wherein the network device comprises circuitry configured to:
identify a first token in the data sequence;
search the wildcard lookup table for a match based on the first token;
upon identifying a first entry that matches, determine to continue searching the wildcard lookup table based on an action stored in the first entry;
identify a key in the first entry;
combine the key with a second token in the data sequence to create a new search query; and
search the wildcard lookup table based on the new search query.

2. The network device of claim 1, wherein the circuitry is configured to:
upon identifying a second entry that matches the new search query, determine to continue searching the wildcard lookup table based on an action stored in the second entry;
identify a second key in the second entry;
combine the second key with a third token in the data sequence to create a second new search query; and
searching the wildcard lookup table based on the second new search query.

3. The network device of claim 1, wherein the circuitry is configured to:
upon identifying a second entry that matches the new search query, determine the second entry stores an action other than continuing the search, wherein the network device is configured to perform the action.

4. The network device of claim 3, wherein the action is performed on network traffic or a packet corresponding to the data sequence.

5. The network device of claim 4, wherein the data sequence is a domain name corresponding to the network traffic or packet.

6. The network device of claim 4, wherein the data sequence is an IP address corresponding to the network traffic or packet.

7. The network device of claim 1, wherein the wildcard lookup table includes a first plurality of entries that store (i) match terms, (ii) an action to continue the search, and (iii) unique keys that are combined with tokens of data sequences received by the network device.

8. The network device of claim 7, wherein the wildcard lookup table includes a second plurality of entries different from the first plurality of entries, wherein each of the second plurality of entries stores (i) match terms and (ii) an action different from a continuing the search, wherein each of the second plurality of entries does not store unique keys that are combinable with tokens of the data sequences.

9. The network device of claim 1, wherein the circuitry is configured to, before searching the wildcard lookup table for a match based on the first token:

combine the first token with a default key to create a search query.

10. The network device of claim 1, further comprising a smart network interface card (SmartNIC) that contains the wildcard lookup table and the tokenizer.

11. The network device of claim 1, further comprising a network switch that contains the wildcard lookup table and the tokenizer.

12. A method, comprising:

receiving a data sequence;

identifying a first token in the data sequence;

searching a wildcard lookup table for a match based on the first token;

upon identifying a first entry that matches, determining to continue searching the wildcard lookup table based on an action stored in the first entry;

identifying a key in the first entry;

combining the key with a second token in the data sequence to create a new search query; and searching the wildcard lookup table based on the new search query.

13. The method of claim 12, further comprising:

upon identifying a second entry that matches the new search query, determining to continue searching the wildcard lookup table based on an action stored in the second entry;

identifying a second key in the second entry;

combining the second key with a third token in the data sequence to create a second new search query; and searching the wildcard lookup table based on the second new search query.

14. The method of claim 12, further comprising:

upon identifying a second entry that matches the new search query, determining the second entry stores an action other than continuing the search; and performing the action, wherein the action is performed on network traffic or a packet corresponding to the data sequence.

15. The method of claim 14, wherein the data sequence is a domain name corresponding to the network traffic or packet.

16. The method of claim 14, wherein the data sequence is an IP address corresponding to the network traffic or packet.

17. The method of claim 12, wherein the wildcard lookup table includes a first plurality of entries that store (i) match terms, (ii) an action to continue the search, and (iii) unique keys that are combined with tokens of data sequences received by a network device.

18. The method of claim 17, wherein the wildcard lookup table includes a second plurality of entries different from the first plurality of entries, wherein each of the second plurality of entries stores (i) match terms and (ii) an action different from a continuing the search, wherein each of the second plurality of entries does not store unique keys that are combinable with tokens of the data sequences.

19. The method of claim 12, wherein the method further comprises, before searching the wildcard lookup table for a match based on the first token:

combining the first token with a default key to create a search query.

20. The method of claim 12, further comprising:

upon identifying that none of the entries in the wildcard lookup table matches the new search query, performing a default action, wherein the default action is performed whenever a received data sequence does not satisfy any of the wildcard lookups represented by the wildcard lookup table.

\* \* \* \* \*